UNITED STATES PATENT OFFICE.

CARL BOSCH, ALWIN MITTASCH, AND CARL NERESHEIMER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

MANUFACTURE OF UREA.

1,274,503.   Specification of Letters Patent.   Patented Aug. 6, 1918.

No Drawing.   Application filed April 16, 1915. Serial No. 21,911.

*To all whom it may concern:*

Be it known that we, CARL BOSCH, ALWIN MITTASCH, and CARL NERESHEIMER, citizens of the German Empire, residing at Ludwigshafen-on-the-Rhine, Germany, have invented new and useful Improvements in the Manufacture of Urea, of which the following is a specification.

This invention relates to the formation of urea from ammonium carbamate, and consists in carrying out this process in the presence of foreign bodies which act as catalyzers. Bodies of the most varied kinds have been found to possess, even when employed in small quantities, the property of accelerating the reaction, for instance charcoal, sugar, gum, urea and sulfo-urea, the oxids and the salts of metals, and in particular those of the light metals, such as carbonates, nitrates, sulfates, sulfids, and the chlorids of the alkalis and the alkaline earths can be used. Also acids, other than carbonic acid may be used which may be added in the form of ammonium salts. With particular advantage a small quantity of water can be used, but its quantity must be limited so as to leave unaltered at least fifty per cent. of the ammonium carbamate in the mixture to be treated. The water can be introduced either in the free state or in the form of compounds from which water easily can be set free, such as neutral ammonium carbonate or salts containing water of crystallization. Further on, more than one of the said catalyzers can be used simultaneously.

In this application we do not claim specifically the use of salts of light metals as catalytic substances, the latter being claimed in our application Serial No. 138,122, filed December 20, 1916.

The following examples serve to illustrate the invention, but the invention is not confined to the examples.

Example 1: Mix ammonium carbamate, for instance such as has been formed by bringing, under pressure, carbonic acid into reaction with liquid ammonia, with ten to twenty per cent. of its weight of neutral ammonium carbonate; heat the mixture in a vessel capable of withstanding the pressure forming, at a temperature of about 135 to 140° C. The formation of urea takes place very quickly. The urea is then obtained by distilling off the unaltered ammonium carbamate and carbonate and the water formed owing to the reaction. The initial material may also contain slight quantities of ammonium bicarbonate.

Example 2: Mix ammonium carbamate with about 1.8 to 3.3% of its weight of water and heat the mixture in a vessel capable of withstanding the pressure forming, at a temperature of 135 to 140 degrees C. The formation of urea takes place much more quickly than with pure ammonium carbamate and to a much greater degree than with ammonium carbonate alone. From the product the unaltered ammonium carbamate, the ammonium carbonate formed and the water are removed by distillation.

Now what we claim is:—

1. The process of making urea which comprises mixing with ammonium carbamate a relatively small proportion of a catalyst which will not convert more than half the carbamate into carbonate and then heating the mixture under conditions which effect conversion of the carbamate into urea, said catalyst being a substance which will promote this urea-forming reaction.

2. The process of making urea which comprises mixing with ammonium carbamate a relatively small proportion of water insufficient to convert half the carbamate into carbonate and then heating the mixture under conditions which effect conversion of the carbamate into urea, the water serving as a catalyst in promoting this urea-forming reaction.

In testimony whereof we have hereunto set our hands in the presence of two subscribing witnesses.

CARL BOSCH.
ALWIN MITTASCH.

Witnesses:
KARL HOLVERMANN,
ARTHUR DENONVILLE.

CARL NERESHEIMER.

Witnesses:
HEINRICH A. HAENDLEY,
HEINRICH DOSCH.